United States Patent [19]

Matthews

[11] 4,342,197

[45] Aug. 3, 1982

[54] GEOTHERMAL PUMP DOWN-HOLE ENERGY REGENERATION SYSTEM

[75] Inventor: Hugh B. Matthews, Boylston, Mass.

[73] Assignee: Sperry Corporation, New York, N.Y.

[21] Appl. No.: 180,745

[22] Filed: Aug. 25, 1980

[51] Int. Cl.³ .............................................. F03G 7/00
[52] U.S. Cl. .................................... 60/641.4; 60/641.2
[58] Field of Search ............................ 60/641.2, 641.4; 165/45

[56] References Cited

U.S. PATENT DOCUMENTS 3,898,020 8/1975 Matthews ...................... 60/641.4 X
4,142,108 2/1979 Matthews ...................... 60/641.4 X

*Primary Examiner*—Allen M. Ostrager
*Assistant Examiner*—Stephen F. Husar
*Attorney, Agent, or Firm*—Howard P. Terry

[57] ABSTRACT

Geothermal deep well energy extraction apparatus is provided of the general kind in which solute-bearing hot water is pumped to the earth's surface from a subterranean location by utilizing thermal energy extracted from the hot water for operating a turbine motor for driving an electrical power generator at the earth's surface, the solute bearing water being returned into the earth by a reinjection well. Efficiency of operation of the total system is increased by an arrangement of coaxial conduits for greatly reducing the flow of heat from the rising brine into the rising exhaust of the down-well turbine motor.

3 Claims, 3 Drawing Figures

GEOTHERMAL PUMP DOWN-HOLE ENERGY REGENERATION SYSTEM

The Government has rights in this invention pursuant to Contract No. DE-AC03-79ET27131 awarded by the U.S. Department of Energy.

BACKGROUND OF THE INVENTION

1. Field of the Invention

The invention relates generally to efficient means for the generation of electrical power by utilizing energy from natural subterranean geothermal sources and, more particularly, relates to arrangements for efficient superheated fluid generation and pumping for application in deep, hot water wells for the beneficial transfer of thermal energy to the earth's surface.

2. Description of the Prior Art

Generally related geothermal power generation systems have been particularly discussed in recent U.S. Pat. Nos. assigned to Sperry Corporation including:

H. B. Matthews—3,824,793 for "Geothermal Energy System and Method", issued July 23, 1974;

H. B. Matthews—3,898,020 for "Geothermal Energy System and Method", issued Aug. 5, 1975;

R. Govindarajan, J. L. Lobach, K. E. Nichols—3,905,196 for "Geothermal Energy Pump Thrust Balance Apparatus", issued Sept. 16, 1975;

J. L. Lobach—3,908,380 for "Geothermal Energy Turbine and Well System", issued Sept. 30, 1975;

H. B. Matthews—3,910,050 for "Geothermal Energy System and Control Apparatus", issued Oct. 7, 1975;

H. B. Matthews—3,938,334 for "Geothermal Energy Control System and Method", issued Feb. 17, 1976;

H. B. Matthews—3,939,659 for "Geothermal Energy System Fluid Filter and Control Apparatus", issued Feb. 24, 1976; and K. E. Nichols—3,961,866 for "Geothermal Energy System Heat Exchanger and Control Apparatus", issued June 8, 1976.

Systems of the foregoing types may be improved by use of the present invention as will be further discussed in the present specification; in general, they comprise geothermal energy recovery systems making use of thermal energy stored by subterranean heat sources in hot, solute-bearing well water to generate a super-heating working fluid from a surface-injected flow of a clean liquid; the super-heated fluid is then used to operate a turbine-driven pump within the well for pumping the hot brine at high pressure and always in liquid state to the earth's surface, where it transfers its heat in a binary closed loop, heat-exchanger turbine-alternator combination for generation of electrical power. Residual brine is pumped back into the earth, while the clean, cooled working liquid is regenerated at the surface-located system and is returned to the deep well pumping system for again generating heated working fluid. The foregoing patents also illustrate improvement features in the form of hydrodynamic radial and thrust bearings and pressurized liquid bearing lubrication means. A reverse flow, deep well vapor turbine motor of compact nature is also disclosed, along with features of surface control and power generation systems.

SUMMARY OF THE INVENTION

The present invention is an improved geothermal energy extraction system that recovers thermal energy stored in hot solute-bearing well water to generate a super-heated fluid from a surface injected flow of working fluid. The super-heated fluid is then used to operate a turbine-driven pump within the well for pumping the hot well water or brine at high pressure and always in liquid state to the earth's surface, where it transfers its heat content in a binary closed-loop heat-exchanger turbine-alternator combination for generating electrical power. Residual cooled brine is pumped back into the earth, while the clean, cooled working fluid is liquified at the surface-located system and is returned to the deep well pumping system again for generating working fluid. In the related prior art systems, the down-well turbine exhaust returns to the earth's surface separated from the stream of rising hot brine only by the wall of the conduit enclosing the turbine exhaust, thus the rising turbine exhaust picks up a significant amount of heat flow through that conduit to add to the temperature of the already superheated exhaust, all of which super-heat must normally be uselessly dissipated by augmented surface equipment before its condensation and recycling can be effected.

In the present invention, the prior art apparatus is modified to overcome the prior art defect by greatly reducing the flow of heat from the rising brine into the rising exhaust. For this purpose, an insulating conduit is provided for the rising exhaust. Furthermore, thermally conductive fins are added to the conduit for the downward-flowing working liquid; these fins extend from the exterior of the working liquid conduit into the exhaust passageway. In this manner, the heat transfer rate between the turbine motor exhaust and the liquid working fluid is much greater, say ten times, than the brine-to-exhaust fluid heat transfer rate. Accordingly, much of the initial down-well turbine exhaust superheat and the heat extracted from the brine by the turbine exhaust vapor is beneficially inserted into the down-flowing working liquid, which heat is then used beneficially by the down-well turbine as part of its required input driving energy.

DESCRIPTION OF THE PREFERRED EMBODIMENTS

Figure 1:
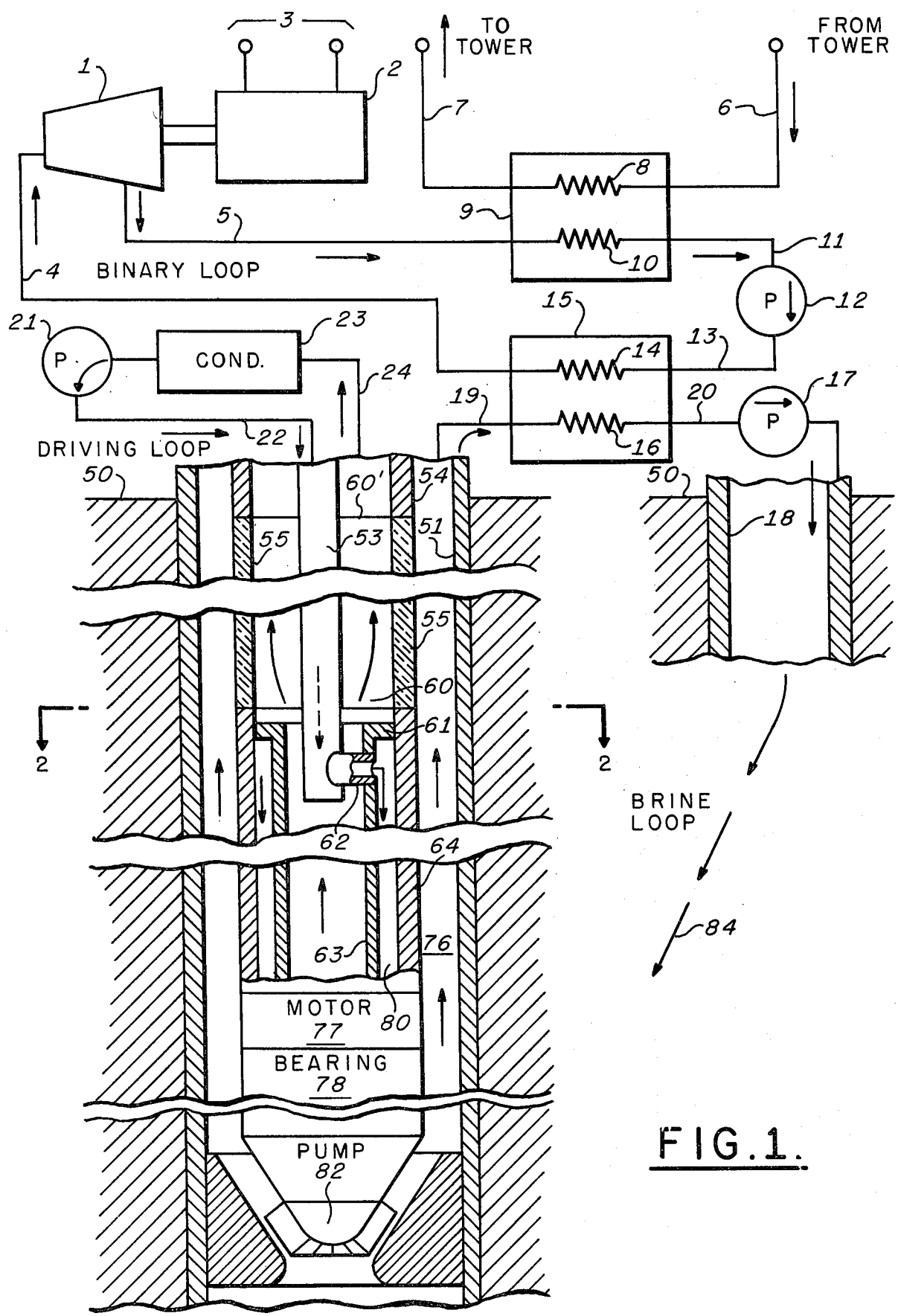
FIG. 1 is an elevation view, partly in cross-section of the novel deep well geothermal conversion system, also illustrating cooperating surface power-generation apparatus.

FIG. 1 illustrates one embodiment of the novel geothermal energy extraction system as being composed of three major sub-systems. The first or geothermal well sub-system extends from its well head located adjacent the earth's surface 50 for a distance far below that surface into an effective cavity or region where a copious supply of extremely hot water or brine under high pressure is naturally available. An active turbine motor 77 and a brine pump 82 are supported in bearing section 78 adjacent the hot water reservoir within a conventional well casing pipe 51 for operation in the manner generally described in the aforementioned Matthews U.S. Pat. Nos. 3,824,793 and 3,910,050 and elsewhere. In such prior systems, a working fluid is turned into superheated fluid in superheated fluid generator 80 heated by the flow of hot brine past it in well casing 51. The vapor passes from generator 80 to drive turbine motor 77 which thereby drives brine pump 82. The exhausted vapor flows from turbine motor 77 via conduits 63, 55 to the earth's surface, there to be condensed in condenser 23 and returned in liquid form by pump 21 via conduits 22, 53 to vapor generator 80. A second sub-system of the present invention in the form of a brine reinjection well 18 also extends from a location at the earth's surface 50 into deep earth strata which may be horizontally spaced from the aforementioned hot brine source by a considerable distance; well 18 functions to provide a return path for the brine, permitting it to be reheated and recycled by the down-well pump 82 as indicated by arrow 84.

Apparatus at the earth's surface forms a third sub-system and cooperates with the geothermal and reinjection well system according to the present invention, as is illustrated in FIG. 1. It will be understood that an objective of the invention is to generate large quantities of electrical power at terminals 3 at the earth's surface using a conventional fluid turbine 1 driving the electrical power generator 2, both preferably located at ground level. For this purpose, hot brine is pumped to the earth's surface by the geothermal well pump 82, being fed by casing 51 and its extension 19 to element 16 of a conventional boiler-heat exchanger device 15. Apparatus 15 is a conventional closed tank-like device designed to exchange heat between conventional heat exchanger elements 14 and 16 located therein. Elements 14 and 16 may take the forms of lineal or coiled pipes exchanging thermal energy by direct thermal conduction through their metal walls or through a suitable fluid disposed in the well known manner about them. The well pump 82 forces the hot brine upward through the annular region 76 between well casing 51 and conduits 54, 55, 64 and its thermal content is a significant source of heat for supply to the input element 16 of device 15. As in the aforementioned Matthews U.S. Pat. No. 3,910,050, the brine passing through element 16 also passes through pipe 20 after having been dropped in temperature within heat exchanger 15 and is then fed through pump 17, if needed, into reinjection well 18. Thus, the brine and its dissolved mineral salts pumped to the surface in well casing 51 are returned harmlessly into the ground for recycling via path 84 and upward in passageway 76 by pump 82.

The binary surface energy conversion system removes useful energy from heat exchanger 15 via heat exchanger element 14 to operate the conventional surface-located vapor turbine motor 1. For this purpose, a conventional organic fluid affording enhanced Rankin cycle operation may be supplied in liquid form by pump 12 through conduit 13 to heat exchanger element 14, wherein it is transformed into an energetic working fluid that is coupled by conduit 4 to the input stage of turbine 1. After performing useful work therein, the turbine exhaust flows via conduit 5 through input element 10 of a second heat exchanger or condenser 9 and then flows as a condensed liquid through conduit 11 to pump 12 for recycled usage. Condenser 9 may be cooled by a flow of cool water from a cooling tower (not shown) through conduit 6, heat exchanger element 8, and conduit 7. Thus, the combination utilizes energy found in a deep geothermal well for efficient generation of electrical power at terminals 3 of the conventional electrical alternator 2 turned by the organic vapor driven surface turbine motor 1.

Figure 2:
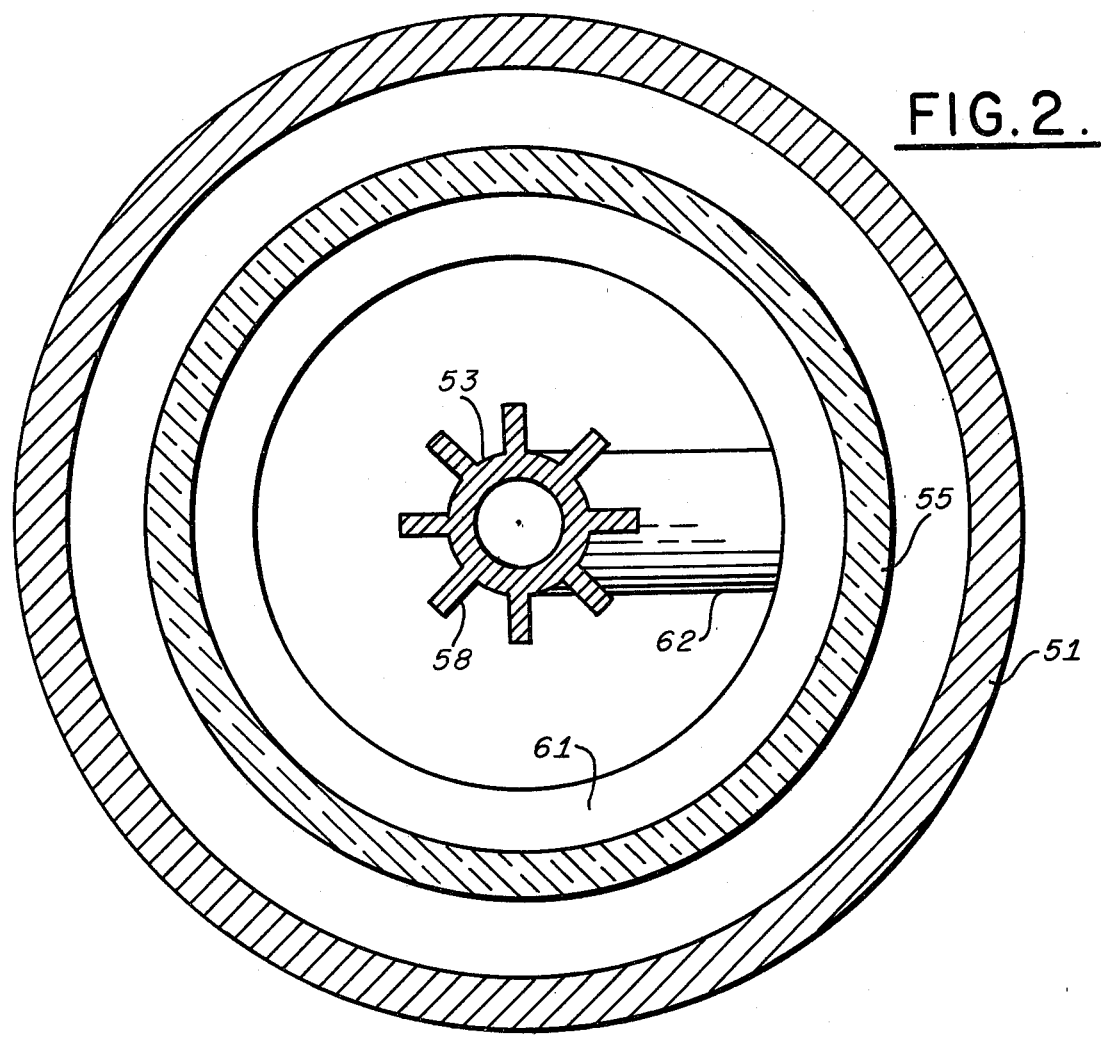
FIG. 2 is a cross-section view taken along the line 2—2 of FIG. 1.

Operation of the down-well pump driving loop beneficially uses the exhaust working vapor from the down-well turbine motor 77 that flows upward within the coextensive conduits 64, 55, 54. For example, the exhaust is coupled from conduit 54 through conduit 24 into a conventional condenser 23. Thereupon, the condensed working fluid flows through pump 21 and conduit 22 into the central down-going working fluid conduit 53. As seen in FIGS. 1 and 2, the flow of the liquid is through conduit 53 and out of the radial conduit or manifold 62 into the vapor generator 80, the upper end of generator 80 being closed by an annulus 61.

As further seen in FIGS. 1 and 2, the present invention enjoys improved operation with respect to the prior art by employing a conduit 55 made in the conventional manner of thermally insulating material; it significantly reduces heat flow from the brine in passageway 76 into the rising exhaust fluid within its interior. A metal insulation-covered conduit 55 may alternatively be used. Insulator conduit 55 is threaded or otherwise conventionally joined at 60 to the cylindrical casing 64 which functions as a container for the down-well motor-pump system and also acts as one wall of brine passageway 76. The upper end of insulator conduit 55 is similarly joined at 60' at the surface well-head to conduit 54. In this manner, flow of excess heat from the brine in passageway 76 into the rising exhaust fluid is desirably greatly reduced. The insulation material may be of molded refractory materials cast with a suitable binder and may contain glass or asbestos or similar fibers. Also, turbine motor 77 and brine pump 82 are primarily supported by conduit 55.

Operational efficiency is further enhanced by constructing the central working-liquid injection conduit 53 of a good thermally conducting metal tolerant of its environment and by further supplying it with a plurality of radial thermally conducting fins such as fin 58. Conduits 53, 54, 64 may be made of an alloy steel such as stainless steel. Using these improvements, heat normally added from the brine to the rising turbine exhaust is significantly and beneficially reduced. Furthermore, most of the initial exhaust superheat of the prior art system and any heat extracted from the brine is beneficially inserted into the down-flowing working liquid before reaching the down-well working superheated fluid generator, which heat is thereupon beneficially used in the down-well turbine as part of its required input energy. The working fluids in the binary loop and in the driving loop may be water or preferably may be selected from isobutane, propane, propylene, difluoromethane, and other commonly used halogen-substituted high molecular weight refrigerants of the hydrogen-substituted hydrocarbon or chlorofluorocarbon type. The apparatus may be put into operation or stopped using the procedure set forth in the aforementioned Matthews U.S. Pat. No. 3,824,793.

Figure 3:
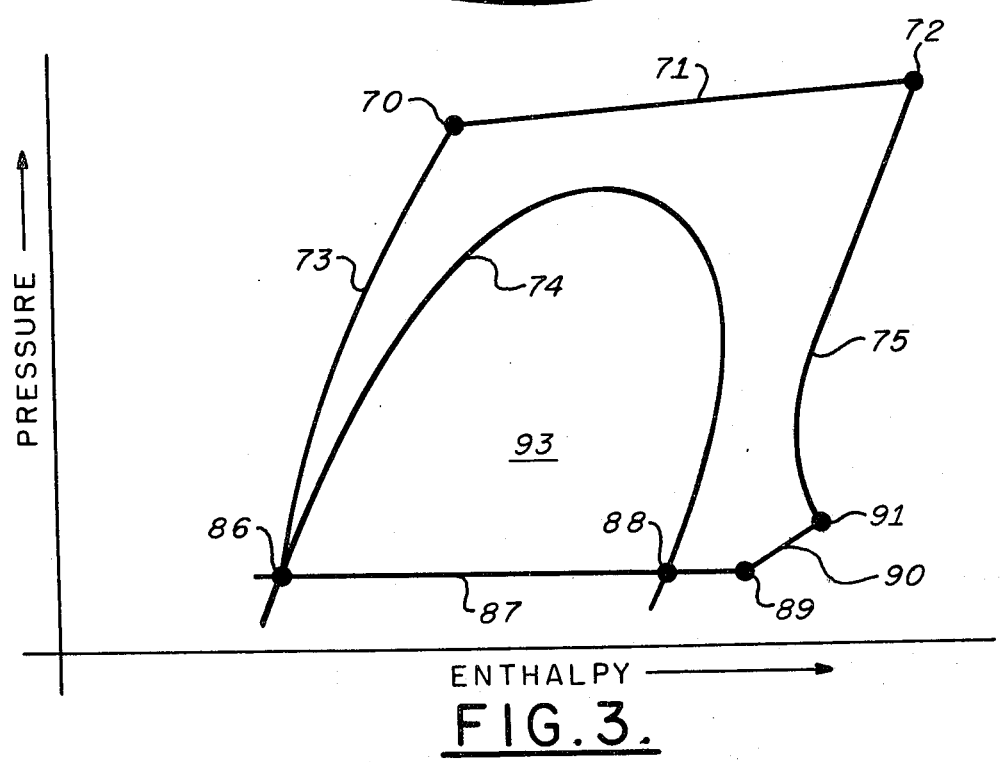
FIG. 3 is a graph useful in explaining the operation of the invention.

While the structure, operation, and advantages of the invention are readily understood from the foregoing, its features may be further described from the pressure-enthalpy graph of FIG. 3. The line 73 between points 86, 70 represents a gravity head pressurizing process with heating by energy extracted from the rising exhaust of the down-well turbine motor 77 along line 90 between points 89, 91 and by potential energy exchange. The point 70 represents the P-h condition of the working liquid within conduit 53 upon reaching the vapor generator radial entry conduit 62. Along line 71 between points 70 and 72, there is a slight pressurization of the working fluid by gravity, significant heating by direct extraction from the brine to generate the energetic vapor within down-hole heat exchanger 80, and a slight heating by potential energy exchange. The working vapor now has the P-h status of point 72 of FIG. 3 as it leaves generator 80.

The falling curve 75 between points 72 and 91 shows the falling pressure situation brought about by the performance of useful work in driving the down-hole turbine motor 77. The line 90 between points 91 and 89 corresponds to the rising of the down-well turbine motor exhaust toward the surface within conduit 55. A small amount of heat is derived from the brine flowing in casing 51 due to the small, but finite, thermal conductivity of the insulator conduit 55. However, a greater amount of heat is transferred to the down-going working liquid by thermal conduction through the wall of conduit 53. Any heat normally undesirably transferred from the brine through the insulated conduit 55 into the rising exhaust is substantially and beneficially transferred through the high conductivity wall of conduit 53 into the down-flowing organic working fluid. There is an enthalpy-to-potential energy exchange and depressurizing due to the lessened gravity head. Along line 87 between points 89 and 86, de-superheating and condensing occurs, returning the P-h state to that at the top of the working liquid conduit 53. The area 93 bounded by curve 74 defines the dual phase region of the organic or other working fluid of the driving loop. In this manner, a major part of the initial exhaust superheat and the heat extracted by the down-well turbine exhaust is beneficially inserted into the down-going working liquid, which heat is then beneficially and directly used by the down-hole turbine motor. Thus, the need to remove and dissipate such excess heat at the earth's surface is obviated.

While the invention has been described in its preferred embodiments, it is to be understood that the words which have been used are words of description rather than of limitation and that changes within the purview of the appended claims may be made without departing from the true scope and spirit of the invention in its broader aspects.

I claim;

1. Apparatus for the recovery of thermal energy at a surface station from a source of hot liquid disposed at a subterranean station within the interior region of the earth comprising:

thermally conductive conduit means extending from said surface station to said subterranean station for conveying a working liquid in a relatively cool state and including a plurality of radially extending fins, superheated fluid generator means for converting said working liquid into an energetic fluid for driving turbine motive means at said subterranean station, and pump means at said subterranean station operatively coupled to and responsive to said motive means for pumping said hot liquid from said interior region in heat exchanging relation with said vapor generator means, and thermally insulative conduit means disposed concentrically about said thermally conductive conduit means for guiding the exhaust of said motive means toward said surface station, said thermally conductive and said thermally insulative means being so disposed and characterized as to minimize heat flow from said hot liquid into said exhaust and to maximize heat flow from said exhaust into said working liquid.

2. Apparatus as described in claim 1 wherein said superheated fluid generator means, said pump means, and said motive means are supported primarily by said thermally insulative conduit means from said surface station.

3. Apparatus as described in claim 1 wherein the exhaust from said motive means is applied through said thermally insulative conduit means and surface located condenser means and then through said thermally conductive conduit means to the input of said heat exchanger means.

* * * * *